United States Patent [19]
Hebert et al.

[11] Patent Number: 5,920,546
[45] Date of Patent: Jul. 6, 1999

[54] METHOD AND APPARATUS FOR CONFERENCING IN AN EXPANDABLE TELECOMMUNICATIONS SYSTEM

[75] Inventors: Mark P. Hebert, Kingston; Robert H. Squires, East Falmouth; James F. Allen, Sandwich; Michael E. Noonan, Rochester, all of Mass.

[73] Assignee: Excel Switching Corporation, Hyannis, Mass.

[21] Appl. No.: 08/808,840

[22] Filed: Feb. 28, 1997

[51] Int. Cl.[6] .............................. H04L 12/16; H04M 1/00
[52] U.S. Cl. ........................ 370/260; 370/352; 379/158
[58] Field of Search .................................. 370/496, 522, 370/352, 375, 260, 424, 223, 259, 263, 265, 266; 379/157, 158, 201, 202, 909; 395/200.33

[56] References Cited

U.S. PATENT DOCUMENTS

| | | |
|---|---|---|
| 4,569,041 | 2/1986 | Takeuchi et al. . |
| 5,276,678 | 1/1994 | Hendrickson et al. . |
| 5,321,744 | 6/1994 | Madonna et al. . |
| 5,349,579 | 9/1994 | Madonna et al. . |
| 5,544,163 | 8/1996 | Madonna ................................ 370/60.1 |
| 5,590,127 | 12/1996 | Bales et al. ............................... 370/260 |
| 5,659,542 | 8/1997 | Bell et al. ................................ 370/496 |

OTHER PUBLICATIONS

D'Ortenzio, Remo J., "Conferencing Fundamentals for Digital PABX Equipments", *1977 International Conference on Communications—Conference Record*, Institute of Electrical and Electronics Engineers, Inc., New York, NY 1977.

Bellamy, John, *Digital Telephony*, Second Edition, John Wiley & Sons, Inc., New York, pp. 89–92, 274–277.

*Primary Examiner*—Huy D. Vu
*Assistant Examiner*—Chiho Andrew Lee

[57] ABSTRACT

A method and apparatus for conferencing two or mores calls in an expandable telecommunications system. The system may include a plurality of nodes connected by an inter-nodal network such that the nodes communicate with each other by exchanging variable-length packets of information. At least one node in the system contains digital signal processing circuitry capable of conferencing the voice information from three or more callers interfaced with the system. Packets containing voice information from each conference participant are preferably transmitted via the inter-nodal network to the node having the requisite digital signal processing circuitry. This node performs a conferencing function on that information, packets the resulting conferenced information and transmits those packets via the inter-nodal network to the nodes interfaced with the conference participants.

28 Claims, 7 Drawing Sheets

METHOD AND APPARATUS FOR CONFERENCING IN AN EXPANDABLE TELECOMMUNICATIONS SYSTEM

BACKGROUND OF THE INVENTION

1. Field of the Invention

The present invention relates generally to the field of telecommunications and, more specifically, to a method and apparatus for providing conference services in an expandable switching system.

2. Discussion of the Prior Art

In addition to providing two-way circuit switched connections between callers, many telecommunications systems are able to provide a variety of telecommunications services. For example, subscribers may request services such as call waiting, caller identification and call forwarding, among others. One of the more desired services, especially in commercial contexts, is conferencing. Conferencing refers to the ability of three or more callers, each utilizing a separate telephone set and often located at remote locations from each other, to participate in a single telephone call. In response to the demand for conferencing services, efforts have been made to design and incorporate conferencing systems within existing and new Private Branch Exchange (PBX) switches and public switching systems.

These conferencing systems typically interface with a conventional computer-controlled digital switching matrix within the PBX or public switching system that provides the circuit switching function. A separate bus or conference highway is usually provided between the digital switching matrix and a conference processor. In order to provide conferencing services via the conference processor, these systems typically require that the digital switching matrix interface directly with each participant in the desired conference (i.e., the conferees). That is, regardless of where the calls originate, conventional circuit switched data corresponding to each call is routed, typically through various central offices, to the single PBX or public switching system having the digital switching matrix and the conference processor.

The digital switching matrix, under the control of the computer, then switches the circuit switched data from each conferee onto the conference bus. The conference processor receives the circuit switched data and operates on that data. Typically, the conference processor executes a known conference algorithm, such as summing together the circuit switched data from each conferee. Furthermore, after summing all of the data, the conference processor typically subtracts each conferee's data from the summed total intended for that conferee, in order to minimize echo effects and improve system stability. Thus, the conference processor outputs separate conferenced data for each conferee. Each item of conferenced data is then transmitted to the digital switching matrix within the PBX or public switching system via the conference bus and the digital switching matrix switches the items of conferenced data to the corresponding conferees.

One of the drawbacks of such systems is that they rely upon the existence of a two-way circuit switched connection exchanging conventional circuit switched data between each conferee and the digital switching matrix that is performing the conferencing services. That is, these systems presuppose the existence of a PBX or public switch which receives circuit switched data from conferees interfaced directly with the PBX or public switch. Accordingly, such designs cannot be implemented in telecommunications systems that do not establish such conventional circuit switched connections.

3. Discussion of Related System Not Found in the Prior Art

To provide a telecommunications system with substantially greater flexibility than conventional PBX switches, the assignee of this application developed an expandable telecommunications system. The system, which may utilize a plurality of inter-connected switching nodes, is described in U.S. Pat. No. 5,544,163 co-owned by the assignee of this application and incorporated herein in its entirety. One or more nodes may be interfaced with the Public Switched Telephone Network (PSTN) or a private network so that the node may receive information such as voice information. Each node within the system, moreover, includes circuitry for transmitting and receiving variable-length, packetized information over the network, thereby enabling each node to receive information, such as voice information, from or transmit information to all other nodes.

One method for transmitting information between nodes, known as the Empty Send/Full Return (ESFR) method, is for each node to formulate and transmit one or more packets which has an "empty" payload. The empty packets are received first by an adjacent node on the network which determines whether it has any information to send to the node from which the packet originated. If so, the adjacent node inserts that information into the payload of the packet before the packet passes to the next adjacent node on the inter-nodal network. If the next adjacent node has no information for the packet-originating node the packet simply proceeds to the next adjacent node. This process is repeated at each node until the packet traverses the entire network and returns to the originating node. At this point, the packet will have a "full" payload of information from the other nodes. The originating node then captures the information from the payload. Each node similarly transmits "empty" packets across the network which return filled with information from other nodes intended for the packet-originating node.

Alternatively, a node may formulate and transmit a packet having a payload that is "full" of information destined for other nodes (or for itself). This is known as the Full Send/Empty Return (FSER) method. With this method, the node inserts information intended for other nodes or for itself into a packet and transmits that packet across the network. Each packet is initially received by an adjacent node which determines whether any information in the payload of the packet is addressed to that adjacent node. If so, the information is captured from the payload by the adjacent node before the packet passes to the next adjacent node. The next adjacent node similarly captures any information addressed to it and this process is repeated until each node in the network has captured the information, if any, intended for it from the payload of the packet. Similarly, each node transmits a packet having a full payload, thereby allowing each node access to the information originated by each other node. It should be understood that either process, ESFR or FSER, or a combination of such processes may be utilized to exchange voice information between two callers each of whom is interfaced with a different node, thereby establishing a "connection" between the two callers.

Despite their utility in conventional PBX switches, the conferencing techniques described above are not readily transferable to a system, such as that just described, in which a plurality of nodes transmit variable-length packets over a high-speed network. More specifically, it is neither possible nor practicable to establish a conventional circuit switched connection between a plurality of callers and a single node. Accordingly, new means of providing conferencing services in such systems must be developed.

SUMMARY OF THE INVENTION

It is an object of the present invention to provide a method of conferencing two or more conferees in an expandable telecommunications system.

It is a further object of the present invention to provide a conferencing apparatus that is compatible with an expandable telecommunications system.

It is a still further object of the invention to provide a conferencing system that does not unduly limit the switching capacity otherwise available in an expandable telecommunications system.

Briefly, the invention comprises a method and apparatus for providing conferencing services in a telecommunications system that includes a plurality of switching nodes connected by an inter-nodal, high speed, digital communications network. Each node within the system includes a nodal switch having circuitry for formulating, transmitting and receiving variable-length, packetized information (e.g., voice, data, video, multimedia, control, configuration, maintenance, etc.) over the network, thereby enabling each node to receive information from or transmit information to all other nodes. The transmit and receive functions may be performed by a data transmitter and data receiver included within each nodal switch. At least one node, although preferably more than one node, also includes network or line interfaces so that the node (referred to a programmable switching node) may be connected to the PSTN and/or a private network. Such nodes are thus also able to transmit and receive information, such as voice information, to and from a plurality of users interfaced thereto. Callers, moreover, may request conferencing services from the system, which conferences may include callers interfaced with any node in the system.

In order to perform the requested conferencing, at least one node in the system (e.g., a conferencing node) contains digital signal processing ("DSP") circuitry capable of conferencing the voice information from the callers. To initiate a conference call, the system first locates a conferencing node with available resources which is then designated to perform the requested conferencing. The conferencing node may correspond to a node connected to one or more conference participants or it may be remote from some or all such participants. In other words, the conferencing node need not be interfaced directly to even a single participant in the conference.

In accordance with a preferred embodiment of the invention, each node receiving voice information from a conference participant interfaced thereto utilizes the inter-nodal network to transmit packets containing that information. Transmission by the programmable switching nodes may be either by the Empty Send/Full Return or the Full Send/Empty Return methods. More specifically, pursuant to instructions from the system, the voice information received at each node interfaced with a conferee is addressed and transmitted to the conferencing node. The data receiver at the conferencing node then captures the voice information from all of the conferees. The conferencing node then utilizes its own internal bus structure to pass that voice information to the DSP circuitry which has been allocated to perform the conferencing function. The DSP circuitry executes a conferencing function on the voice information and outputs a different instance of conferenced voice information for each conferee. Each instance of conferenced voice information is then transmitted to the corresponding conferee.

More specifically, the DSP circuitry first places the instances of conferenced voice information on the internal bus of the conferencing node. The instances of conferenced voice information are then received by the data transmitter in the nodal switch which is preferably linked with the bus. Next, the conferencing node may formulate a packet or packets containing the instances of conferenced voice information for transmission via its data transmitter over the network. Specifically, each instance of conferenced voice data may be packetized, addressed and transmitted, according to instructions from the system, to the programmable switching node interfaced with the corresponding conference participant. Each programmable switching node, upon receipt of the packet or packets, then captures the instance of conferenced voice information earmarked for that participant via its own data receiver and switches the information to the participant. This process may be repeated on a high-speed basis such that each conference participant receives (i.e., hears) conferenced voice information corresponding to each other participant in the conference call.

In a first alternative embodiment, the conferencing node may be provided with an additional internal bus structure (a DSP bus) that is dedicated to handling communications between the nodal switch and the DSP circuitry. In this embodiment, the data receiver in the nodal switch places information captured for the DSP circuitry on the DSP bus, rather than the primary Pulse Code Modulation ("PCM") bus. Similarly, the DSP circuitry sends information to the transmitter of the nodal switch via the DSP bus. The flow of communications across the DSP bus is preferably managed by the nodal switch. The addition of a separate DSP bus means that local time slots on the primary PCM bus need not be allocated to perform the requested conferencing services. Accordingly, all of the time slots on the primary bus remain available to carry out other functions being performed by the conferencing node.

To further enhance system performance, the conferencing node may also be provided with an additional data receiver and data transmitter to exchange information intended for or originating from the DSP circuitry. That is, each nodal switch may be provided with an additional receiver and transmitter that are dedicated to capturing and sending information on the network that is either addressed to or originating from the DSP circuitry located at that node. In this embodiment, the packets traversing the inter-nodal network may contain information indicating whether any information in the payload is intended for the DSP circuitry. If so, the DSP receiver captures that information and provides it directly to the DSP circuitry via the DSP bus without utilizing either the primary data receiver or the primary bus. Similarly, conferenced information output by the DSP circuitry is communicated via the DSP bus to the nodal switch where it may be packetized and transmitted across the network by the DSP transmitter, rather than the primary data transmitter.

In a second alternative embodiment, DSP circuitry may be associated with the nodal switch of every node. That is, the nodal switch of each node may include its own DSP circuitry programmed and configured to provide conferencing services. Accordingly, each node includes its own conferencing resources. In this embodiment, conferencing services typically will be provided by the node to which at least one conferee is directly interfaced. Voice information from the other conference participants is then directed to that node via the inter-nodal network. If the DSP circuitry at all nodes interfaced with a conference participant is unavailable, the system will attempt to locate "remote" DSP circuitry that may be allocated to provide the requested conferencing services.

The expandable telecommunications system may also comprise one or more "bridge" nodes that provide a communication link among multiple inter-nodal networks. The bridge node supports bi-directional communication between any two linked networks. By virtue of the bridge node, the system can locate and designate conferencing resources or other communications services available anywhere on the system to perform requested conferencing services. Accordingly, the system may designate a conferencing node located on one network even though the conference participants are all interfaced with programmable switching nodes located on another network. In this arrangement, the bridge node may be used to transmit voice information from the conference participants to the conferencing node and conferenced voice information from the conferencing node to the conference participants.

Although the invention has been described herein with regard to conferencing services, it should be understood that the invention may be used in connection with other services provided by the DSP circuitry. For example, the DSP circuitry may be programmed to provide call progress analysis, recorded announcement transmission, tone generation and transmission or other services, rather than or in addition to conferencing services.

BRIEF DESCRIPTION OF THE DRAWINGS

This invention is pointed out with particularity in the appended claims. The above and further advantages of the invention may be better understood by referring to the following description in conjunction with the accompanying drawings, in which:

DESCRIPTION OF THE PREFERRED EMBODIMENT

Figure 1:
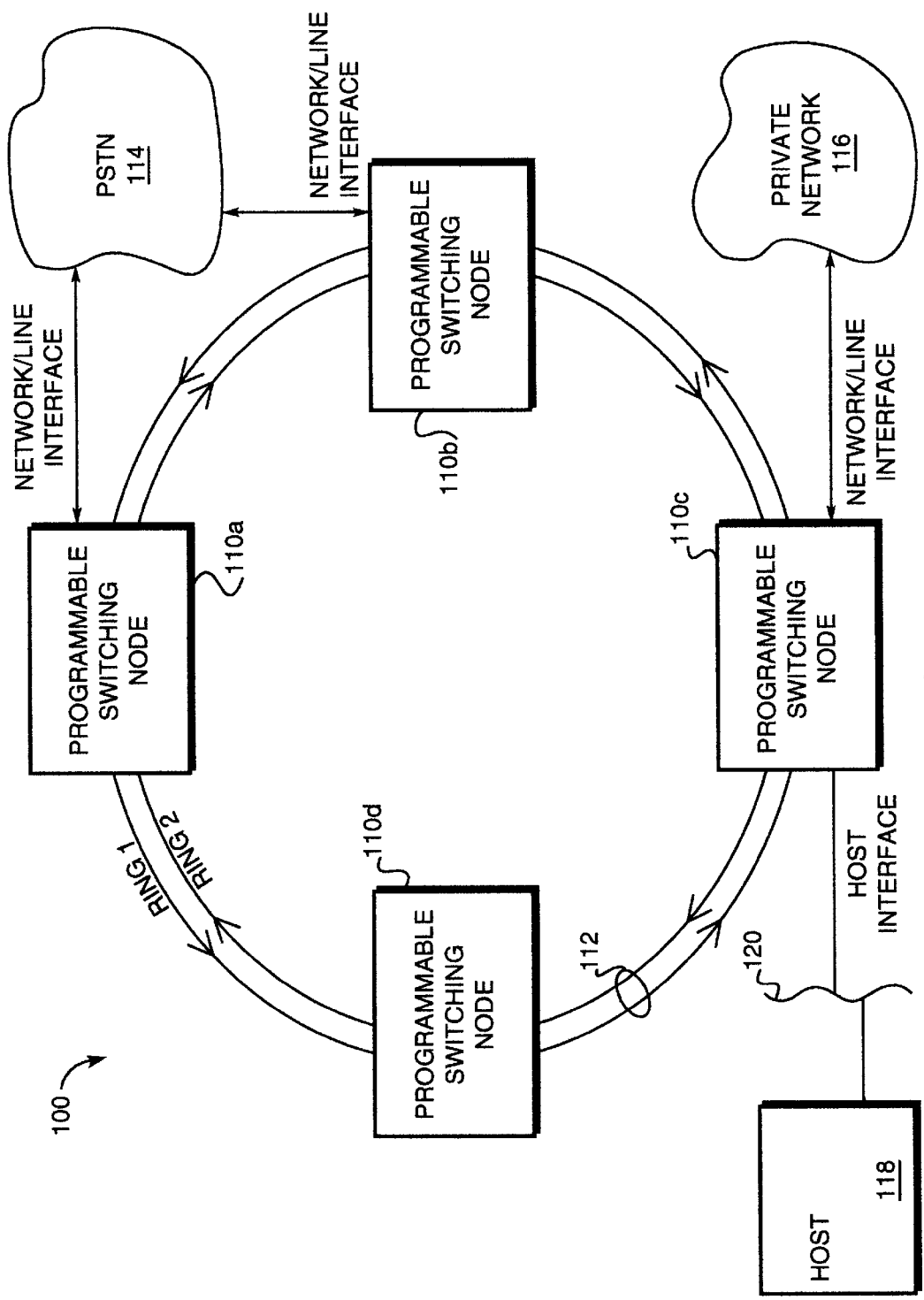
FIG. 1 is a highly schematic block diagram of an expandable telecommunications system employing a ring type inter-nodal network.

FIG. 1 shows a large capacity, expandable, fully programmable telecommunications switching system 100, such as the system described in U.S. Pat. No. 5,544,163 and incorporated herein. The system 100 includes a series of programmable switching nodes 110a–110d connected together by an inter-nodal network 112. The network 112 preferably supports high speed, high bandwidth digital communications between the nodes 110a–110d. The inter-nodal network 112 may be a ring type network implemented using two rings (Ring 1 and Ring 2), as shown in FIG. 1. The network 112 may also be implemented with any of a variety of other types of communications networks, including Ethernet or other types of LANs, wireless communications networks and the PSTN (ATM/SONET).

As shown, nodes 110a and 110b each include a digital network/line interface for connection with PSTN 114. Node 110c also includes a digital network/line interface and is connected to a private network 116. The term "private network" is intended in a broad sense to refer to any network or line or other interface other than the PSTN. Using the inter-nodal network 112, a local port of any node 110a–110c may be connected to any other local port or any remote port in a fully non-blocking manner. The term "local port" is used to refer, with respect to a given node, to a time slot containing circuit switched data either received from or intended for a caller directly interfaced with that node. The term "remote port" is used to refer, with respect to a given node, to a local port of a different node. In the illustration of FIG. 1, node 110d is not connected to either the PSTN 114 or the private network 116.

It should be understood that the network/line interfaces of nodes 110a–110c may terminate either digital networks or analog trunks/lines, or combinations of both types. It should be further understood that the network/line interfaces of any given node may include suitable interfaces for performing communications using ATM, Signaling System 7 (SS7), ISDN, T1/robbed bit, E1/CAS or other communication protocols. It should be further understood that one or more nodes may not include network/line interfaces. Such nodes may instead provide voice processing resources.

The overall operation of the system 100 is preferably controlled by a host 118, which may be implemented with a personal computer (PC), workstation, fault tolerant or other computer on which a user's application software runs. As shown, node 110c includes a host interface which is connected in communicating relationship by a local area network (LAN) 120 with the host 118. The host 118 and node 110c are thus able to exchange messages. The interconnection between the host 118 and node 110c may be provided by Ethernet, asynchronous communication (RS-232) links or other communication links.

The host 118 also communicates with the other nodes 110a, 110b and 110d of the system 100 over the inter-nodal network 112. More specifically, the host 118 communicates with any node 110a, 110b and 110d by passing messages first to node 110c, which, in turn, places the messages on the inter-nodal network 112 for delivery to the appropriate node. Similarly, nodes 110a, 110b and 110d place messages intended for the host 118 on the inter-nodal network 112 and node 110c captures those messages and forwards them via the LAN 120 to the host 118. The host 118 is thus able to communicate with each node 110a–110d on the system 100. Host-node communications are typically used to configure the nodes 110a–110d as well as to direct call processing functions such as making connections and providing communications services (i.e., tone detection, tone generation). In addition, as described in more detail below, the host 118 may also establish conferences among three or more conferees who have access to system 100.

Although only a single host 118 is shown, use of LAN 120 to provide host/node communications permits multiple hosts to control the system 100 (or parts thereof) by configuring each host as a "client" and each node as a "server." Furthermore, it should be understood that other types of host/node interfaces may be used instead of or in addition to the connection to a single node, as shown in FIG. 1. For example, each node 110a–110d may include its own host interface and the host 118 may be connected directly, e.g., by LAN 120, to each node 110a–110d.

Switching Node

Figure 2:
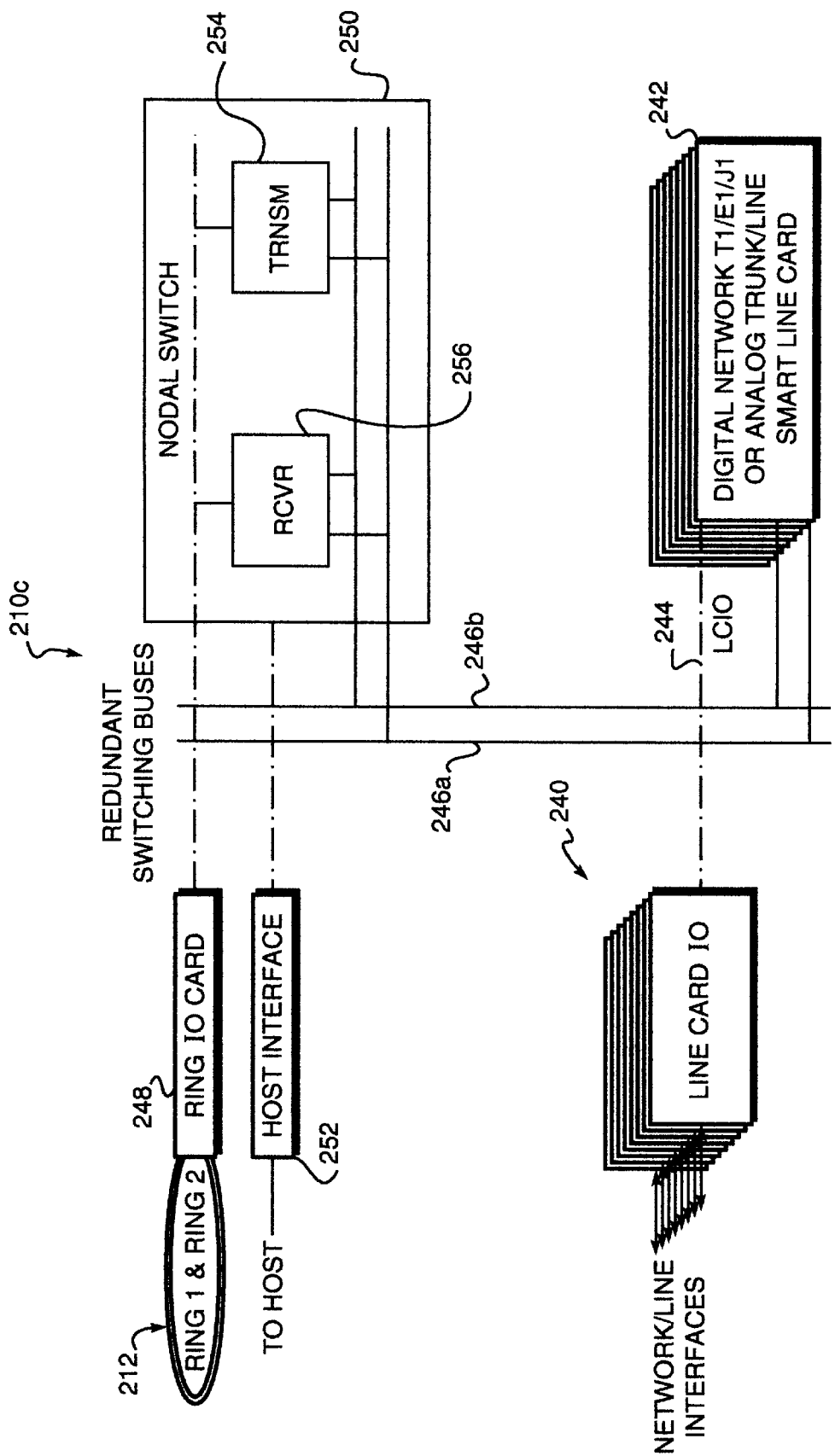
FIG. 2 is a highly schematic block diagram of a programmable switching node that may be used in the system of FIG. 1.

FIG. 2 shows the major functional components of a preferred programmable switching node 210c, such as node 110c of FIG. 1. The node 210c preferably includes digital or analog network/line interfaces that are terminated on a series of line card input/output (IO) cards 240. The line card IO cards 240, in turn, communicate with a series of digital network T1/E1/J1 or analog trunk/line line cards 242. The node 210c also may include two redundant switching buses 246a, 246b which interface with the line cards 242.

It should be understood that rather than T1/E1/J1 or analog trunks/lines, the line card IO cards 240 may support other types of network/line interfaces such as DS3, SONET or others. It should be further understood that a redundant line card 10 card (not shown) may be provided to permit continued operation of the switching node 210c in the event of a failure of one of line card IO cards 240. Similarly, redundant line cards (not shown) may be provided.

The node 210c further includes a ring (network) 10 card 248 that serves as an interface with an inter-nodal network 212, formed by Rings 1 and 2. The ring IO card 248 also communicates with a nodal switch 250, which, in turn, communicates with the line cards 242 via the redundant buses 246a, 246b. As described in more detail below, the nodal switch 250 is able to switch information received from the inter-nodal network 212 to a given local port and also switch information received from a local port to the inter-nodal network 212. A host interface 252 preferably handles communication between the host 118 (FIG. 1) and the node 210c.

In a preferred embodiment, line cards 242 perform real time call processing functions which are required by the network/line interfaces, including analog to digital conversion, if necessary. More specifically, line cards 242 transmit and receive time division multiplex (TDM) data over switching buses 246a and 246b. The nodal switch 250, moreover, has the requisite circuitry to receive, over the buses 246a and 246b, TDM data transmitted in all time slots from all line cards 242. In addition, each switching bus 246a, 246b preferably includes a high level data link control (HDLC) bus over which CPUs (not shown) in the nodal switch 250 and in the line cards 242 may exchange control messages. Thus, the nodal switch 250 is preferably able to control the flow of information over the switching buses 246a, 246b. In particular, data may flow across the switching buses 246a, 246b either in a direction from a line card 242 to the nodal switch 250 (LSDATA) or in a direction from the nodal switch 250 to a line card 242 (SLDATA).

The nodal switch 250 includes a data transmitter 254 for transmitting packetized information, including circuit switched information, over the inter-nodal network 212. The transmitter 254 preferably receives TDM data from the local ports over switching buses 246a, 246b. As described above, the circuit switched data typically originates from the line cards 242. The nodal switch 250 preferably switches the information to a transmitter memory (not shown) prior to packetizing and transmission over the network 212. The nodal switch 250 may also include a data receiver 256 for capturing information moving across the inter-nodal network 212 that is addressed to the node 210c. The receiver 256 similarly includes a receiver memory (not shown) for storage of information, including circuit switched information, captured from the network 212. The output of the receiver 256, moreover, may be switched out of the receiver memory onto the switching buses 246a, 246b for delivery to a preselected local port via the line cards 242 and line card IO cards 240.

Accordingly, circuit switched information, such as voice information, may be received by the node 210c through the line card IO cards 240 and line cards 242, placed in a preselected time slot on the switching buses 246a, 246b, time switched from the busses 246a, 246b and stored in the transmitter memory prior to transmission across the network 212. Similarly, information, such a voice information, may be captured from the network 212 by the receiver 256, stored in receiver memory, switched out of the memory to a second preselected time slot on the switching buses 246a, 246b, read by the line cards 242 and transmitted to the network/line interfaces via the line card IO cards 240.

Conferencing Node

Figure 3:
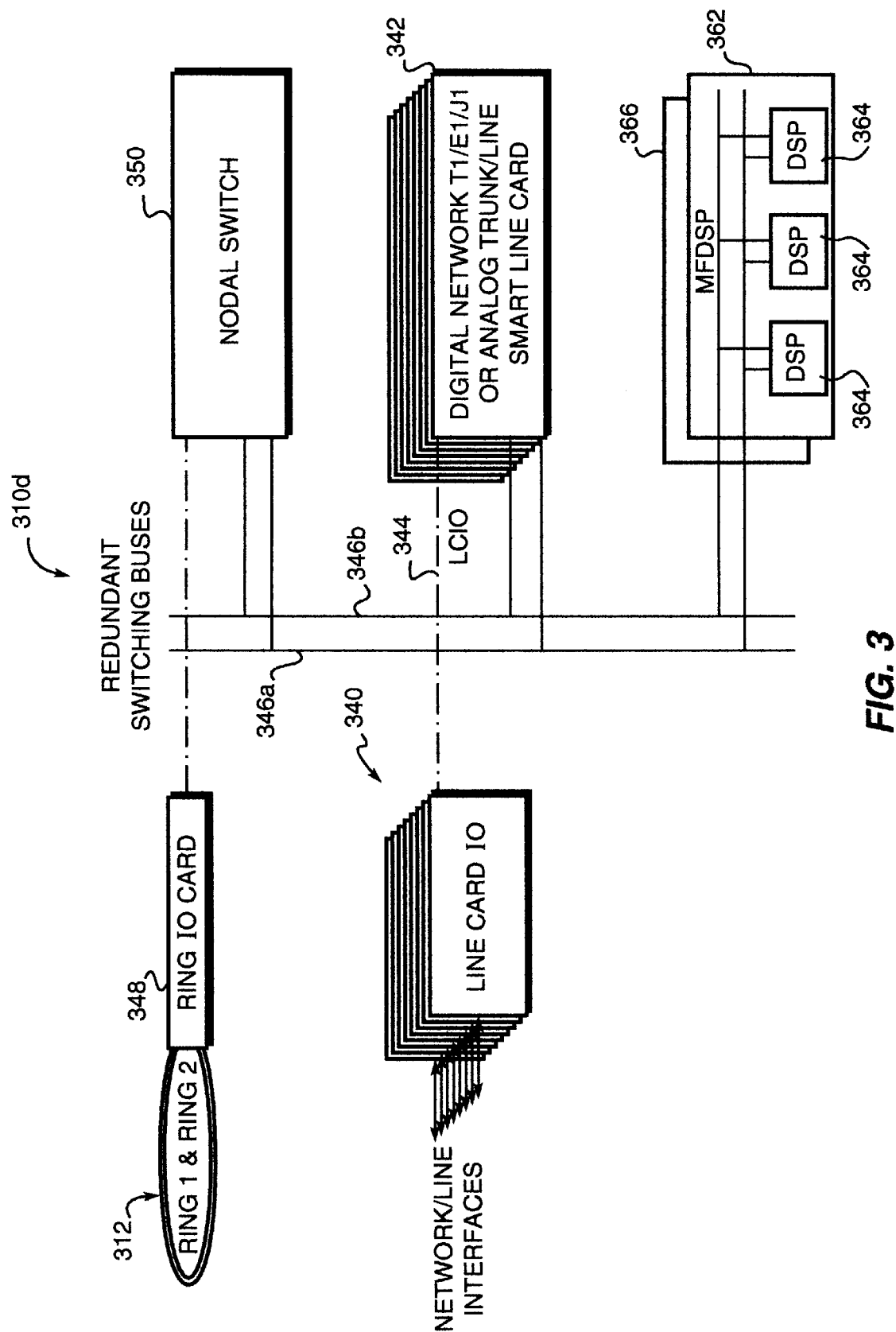
FIG. 3 is a highly schematic block diagram of a conferencing node that may be used in the system of FIG. 1.

FIG. 3 shows the major functional components of a preferred conferencing node 310d, such as node 110d of FIG. 1. As in the programmable switching node 210c (FIG. 2), the conferencing node 310d preferably includes redundant switching buses 346a, 346b, a nodal switch 350 and a ring IO card 348. Although not interfaced with either the PSTN or a private network in this illustration, the conferencing node 310d may also include a plurality of line card IO cards 340 and line cards 342. Thus, it should be understood that the conferencing node 310d may be interfaced with the PSTN 114 (FIG. 1) and/or a private network 116. Unlike node 210c (FIG. 2), however, the conferencing node 310d also includes at least one multi-function digital signal processing ("MFDSP") card 362. The MFDSP card 362 is preferably connected to local buses 346a, 346b so that the MFDSP card 362 may receive TDM data transmitted from the nodal switch 350 or the line cards 342, if any. The MFDSP card 362 also has the ability, under the direction of the nodal switch 350, to transmit information, such as circuit switched data, to the nodal switch 350 or the line cards 342, if any. More specifically, the MFDSP card 362 may be dynamically assigned time slots on the switching buses 346a, 346b by the nodal switch 350.

The MFDSP card 362 provides diverse communications services such as tone detection and generation, voice recorded announcements, call progress analysis, speech recognition, ADPCM compression, etc. through a plurality of DSP chips 364. As described in more detail herein, at least one of the DSP chips 364 on the MFDSP card 354 may be configured to provide conferencing services. The MFDSP card 362 also preferably includes a plurality of PCM banks (not shown) for temporary storage of information received from the buses 246a, 246b. Details of the preferred construction and operation of the MFDSP card 362, as well as buses 246a and 246b, are disclosed in commonly owned U.S. Pat. No. 5,349,579 which is hereby incorporated by reference in its entirety. Redundant MFDSP card(s) 366 may also be included within the conferencing node 310d.

We now proceed to describe a preferred embodiment for establishing conference calls using system 100 (FIG. 1). It should be understood that the system 100 will support conferencing provided that at least one node on the system 100 is equipped with one or more appropriately configured MFDSP cards 362 (FIG. 3). Each MFDSP card 362, moreover, is preferably configured by the host 118 (i.e., through a download of instructions and data).

Figure 4:
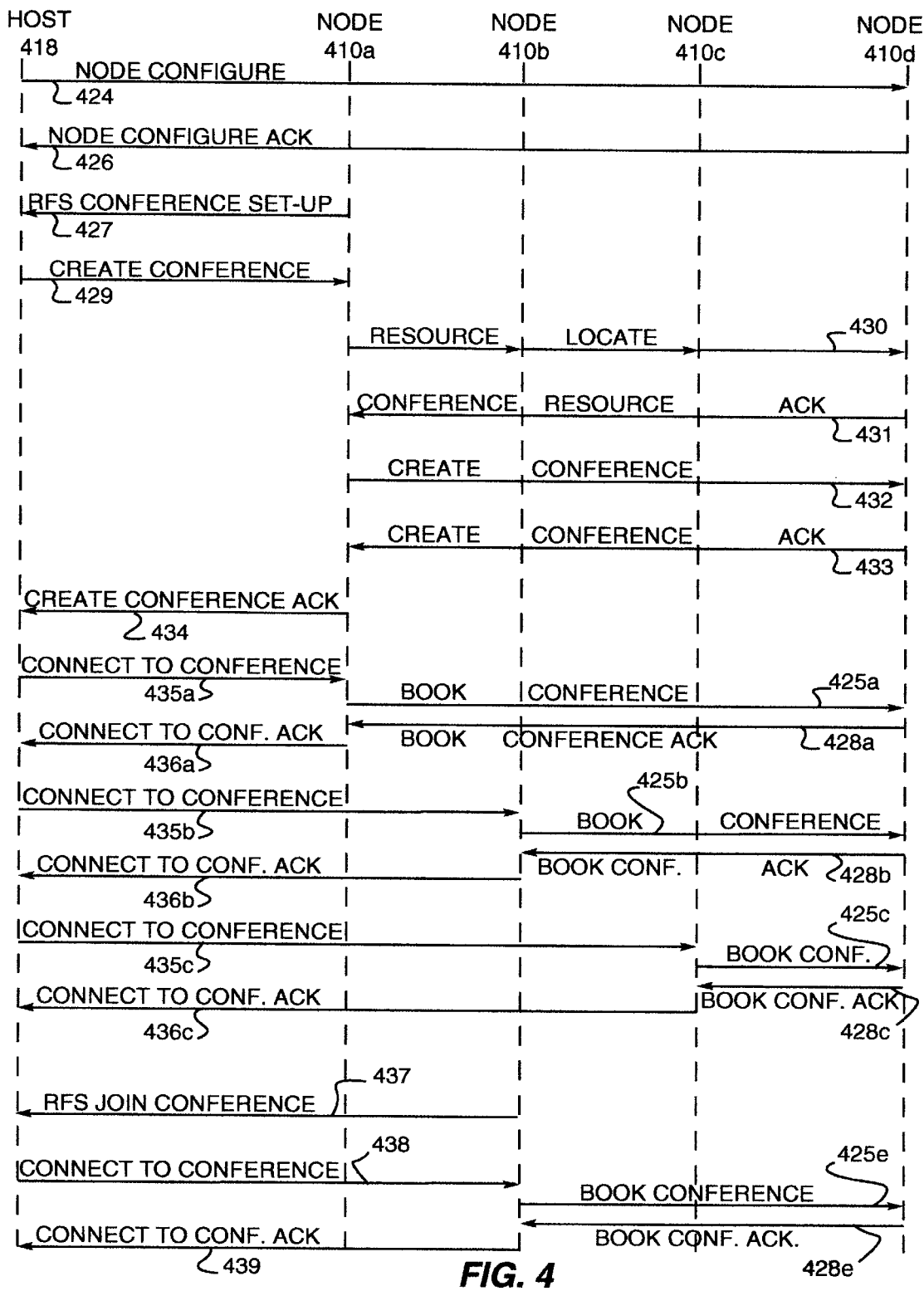
FIG. 4 is a flow diagram showing the messages generated and tasks performed in establishing a conference.

FIG. 4 is a preferred call flow diagram showing a sequence of steps for establishing a conference. Each horizontal arrow represents the transmission of a message between software processes at a host or a node which are represented by the vertical dashed lines. For example, messages may be transmitted between a host 418 and a node, e.g., node 410a, or between nodes, e.g., nodes 410a and 410d. First, the host 118 may issue a Node Configure Message 424 directing those nodes having an MFDSP card(s) (e.g., node 410d) to allocate either some portion or all of their local time slots, not otherwise needed for switching functions, for the purpose of supporting conferencing services. The Node Configure Message 424 may have as its arguments a request to reserve local time slots and a number of time slots to be reserved. To reserve all available time slots, the number of time slots argument may be set to −1, otherwise it may be set to some preselected number of time slots.

Upon receipt of the Node Configure Message 424, the MFDSP-equipped node determines the number of local time slots that are available, reserves the requested number time slots (or all available time slots if less than the requested number) and returns a Node Configure Acknowledgment 426. The number of available time slots may be determined by subtracting the number of time slots needed to support fully non-blocking functionality for all line cards installed in the node from the maximum number of time slots that may be supported by the node's internal bus structure. As line cards are added or removed, the number of available timeslots will change. The Node Configure Acknowledgment 426 indicates how many time slots were successfully allocated. The node may also store this information in a conference time slot free pool (not shown). Failure to allocate time slots may be communicated by a non-acknowledgment (not shown) to the host 418.

We shall assume that a calling party whose line is interfaced with node 410a seeks to place a conference call with two conferees whose lines are interfaced with nodes 410b and 410c, respectively. This may occur by the conference initiator going off-hook, entering a specific code to request a conference call and, possibly, entering the digits of the telephone numbers of other conferees. In addition, we further assume that only one node, e.g. node 410d, contains an MFDSP card 362 (FIG. 3) having an appropriately configured DSP chip 364.

Node 410a, in response to the caller's request to set-up a conference, preferably sends a Request for Service ("RFS") message 427 requesting a conference set-up to the host 418. The RFS 427 may include information regarding the number of conference participants, the type of encoding and whether the conference is to provide broadcast (i.e., listen-only) capabilities, as discussed below. Alternatively, this information may be transmitted in subsequent call processing event messages from node 410a to host 418. In response, the host 418 issues a Create Conference message 429 that is transmitted to node 410a. The Create Conference message 429 authorizes node 410a to locate DSP resources and sufficient time slots in order to conduct the requested conference. If the conference is to permit broadcasting, the Conference Create message 429 sets the number of required time slots at n plus 1, where n is the number of conference participants. If the conference is to permit broadcasting and mixed $\mu$-law and A-law encoding, then the number is set to n plus 2.

The Create Conference message 429 may also specify whether node 410a may utilize only local DSP resources (i.e., DSP resources at node 410a) or whether node 410a may utilize DSP resources that are local or remote (i.e., DSP resources at a node other than node 410a). Similarly, the Create Conference message 429 may instruct node 410a whether broadcast capabilities will be supported and the type of encoding to be used with the conference or any given participant thereof (e.g., $\mu$-law, A-law or mixed).

Node 410a preferably accesses its own system management tables in order to determine whether it has an MFDSP card with an appropriately configured DSP resource and sufficient bandwidth on its local switching buses 246a, 246b (FIG. 2) to handle the conference. Assuming that it cannot support the requested conference and is authorized to utilize remote DSP resources, node 410a preferably transmits a Resource Locate message 430 on the inter-nodal network 112 (FIG. 1). The Resource Locate message 430 may be broadcast to each node in the system 100 requesting each node to determine whether it has available DSP resources and sufficient time slots with which to perform the requested conferencing service. The Resource Locate message 430 preferably includes the number of conferees and the conference type (e.g., broadcast-enabled and type of encoding). Each node, upon receipt of the message, derives the number of requested time slots based on the number of conferees and the conference type and determines whether it has available DSP resources and sufficient local bandwidth to support the requested conference. A node may have sufficient DSP resources available on its MFDSP card to perform the conferencing, but lack sufficient bandwidth (e.g., time slots) on its internal switching buses to manage the data to and from all of the conferees.

It should be understood that rather than being broadcast to all nodes, the Resource Locate message 430 may be addressed only to those nodes (e.g., node 410d) that returned a Node Configure Acknowledgment 426 to the host 418 during the initial configuration process.

Each node in the system 100 (FIG. 1) preferably responds to the node that transmitted the Resource Locate message 430 indicating whether or not it has sufficient conferencing DSP resources and available time slots for the requested conference. More specifically, node 410d transmits a Conference Resource Acknowledgment 431 informing node 410a that node 410d has an MFDSP card with available DSP resources and sufficient bandwidth on its internal switching buses with which to perform the requested conferencing service. Node 410d may also nominally allocate a DSP chip 364 (FIG. 3) and the requested bandwidth in preparation for performing the conferencing function.

In response to the Conference Resource Acknowledgment 431 from node 410d, node 410a transmits its own Create Conference message 432 to node 410d. The Create Conference message 432 directs node 410d to reserve its DSP resource and the requisite time slots needed to provide the conferencing service. Thus, to the extent node 410d receives subsequent resource locate messages, the reserved DSP resource and time slots are no longer shown as available. Node 410d also responds to node 410a with a Create Conference Acknowledgment 433 which includes a unique conference identification for this conference. The conference identification may comprise some combination of the unique identifier corresponding to node 410d (which is assigned during initial configuration of the system 100) and a value corresponding to this particular conference. For example, if this is the only conference presently being supported by node 410d, then the value may be set to 1. If it is the second conference, the value may be set to 2 and so on.

Node 410a also transmits a Create Conference Acknowledgment 434 informing the host 418 that it has located and reserved sufficient DSP resources and time slots to perform the requested conference. The Create Conference Acknowledgment 434 preferably includes as its arguments the conference identifier generated by the conferencing node 410d. Although the Create Conference Acknowledgment 434 may include the digit strings of the conference participants which were received by node 410a from the conference initiator, this information is preferably transmitted to the host 418 by the node(s) through other call processing events. By processing these events and examining the corresponding digit strings, the host 418 determines which nodes are interfaced with a participant to the conference.

To connect each participant to the conference, the host 418 transmits a Connect to Conference message to each node to which a conference participant is interfaced. In particular, host 418 transmits a Connect to Conference message 435*a* to node 410*a* having the conference identifier as its argument. Based upon the conference identifier, node 410*a* determines that node 410*d* is the conferencing node and transmits a Book Conference message 425*a* to node 410*d*. The Book Conference message 425*a* requests access to the conference and indicates which time slot will be used to carry voice information of the participant from node 410*a* to node 410*d*.

Conferencing node 410*d* responds with a Book Conference Acknowledgment 428*a* confirming access to the conference and informing node 410*a* of the time slot that will be used to carry conferenced voice information from node 410*d* to node 410*a* intended for the participant interfaced at node 410*a*. In response to the Book Conference Acknowledgment 428*a*, node 410*a* transmits a Connect to Conference Acknowledgment 436*a*to the host 418. The Connect to Conference Acknowledgment 436*a*informs the host 418 that node 410*a* has connected the participant to the conference.

Similarly, host 418 transmits Connect to Conference messages 435*b*, 435*c* to nodes 410*b*, 410*c*, respectively, informing those nodes of the conference identification. In response, nodes 410*b*, 410*c* each transmit a Book Conference Message 425*b*, 425*c* to conferencing node 410*d*. Again, the Book Conference Messages 425*b*, 425*c* request access to the conference and include information regarding the time slots to be used to carry voice information of the corresponding participants from nodes 410*b*, 410*c* to node 410*d*. The conferencing node 410*d* responds with Book Conference Acknowledgments 428*b*, 428*c* confirming access to the conference and including information regarding the time slots from node 410*d* to nodes 410*b*, 410*c* carrying conferenced voice information intended for those participants. Each of these nodes 410*b*, 410*c* then responds to the host 418 with a Connect to Conference Acknowledgment 436*b*, 436*c*. Each of the participants is now ready to participate in the conference.

Referring back to FIG. 1 and turning first to node 110*a* to which the conference initiator is connected and which corresponds to node 410*a* of FIG. 4, circuit switched data from the conference initiator is received on a line card IO card 240 (FIG. 2) and passed to a line card 242. The data is then passed via the switching busses 246*a*, 246*b* in the LSDATA direction to the nodal switch 250. The data is stored in the transmitter memory of the nodal switch 250. Assuming that the system 100 is utilizing the Empty Send/Full Return method, the circuit switched data from the conference initiator is time switched out of the transmitter memory and inserted into the payload of a packet that was originated by the conferencing node 110*d*. Similarly, the circuit switched data from the conferees connected to nodes 110*b* and 110*c* are time switched out of the corresponding transmitter memories and inserted into the payload of a packet originated by node 110*d*. These packets may be the same or different from the packet containing the data from the conference initiator.

Next, the data receiver of the conferencing node 110*d* captures the "full" payload from the packet(s) that the node 110*d* transmitted "empty" across the network 112. The payload, moreover, contains circuit switched PCM data from each of the conferees. This data is time switched through the receiver memory and passed via the switching busses 246*a*, 246*b* to the MFDSP card 362 (FIG. 3) located on the conferencing node 110*d*. More specifically, the nodal switch 350 may place the data on the buses 246*a*, 246*b* in the LSDATA direction which is constantly monitored by the MFDSP card 362. At the MFDSP card 362, that data is received and operated upon by the DSP resources 364 that have been allocated to perform the conferencing services.

The DSP resources 364 read the PCM data from the PCM banks located on card 362 and performs a conferencing function on the data. The conferencing function may, for example, be any conventional or known algorithm encoded onto or otherwise available for execution by the DSP 364. The output of the DSP 364 is an instance of conferenced PCM data intended for each conferee. Each instance of conferenced PCM data is then provided to the corresponding conferee by reversing the above sequence.

More specifically, each instance of conferenced PCM data is first transmitted to the PCM bank associated with the DSP 364. The MFDSP card 362 then transmits that data in certain time slots on the switching buses 346*a*, 346*b*, preferably in the SLDATA direction. The nodal switch 350, which is monitoring the data flowing in the SLDATA direction, receives the data which then may be stored in the transmitter memory. When an empty packet originated by each node connected to a conferee is received by the conferencing node 110*d*, the corresponding instance of conferenced circuit switched PCM data, intended for the conferee connected to that node, is time switched out of the transmitter memory and inserted into the payload of that packet. When the full packet, after traversing the inter-nodal network 112, returns to the originating node, the instance of conferenced PCM data is captured and stored in the receiver memory in the associated nodal switch. The instance of conferenced PCM data is then time switched out of the receiver memory and passed via buses 246*a*, 246*b* to a line card where it is provided to the conferee interfaced thereto.

By repeating this process on a high speed basis, each conferee is able to "hear" each of the other participants to the conference call. As set forth above, moreover, the present invention provides conferencing services via a node that may be remote to all conferees. The conference is terminated when the conference participants release the connection (i.e., hang-up) or the host 118 may terminate the conference.

At some point during the conference other users may wish to join the conference. Returning to FIG. 4, assume an additional user (e.g., a caller) interfaced with node 410*b* wishes to join the conference. This user, for example, may call a designated number and enter a previously assigned digit string corresponding to the desired conference. Upon receipt of the call, node 410*b* transmits a Request for Service (Join Conference) message 437 to the host 418. The Request for Service (Join Conference) message 437 may include the digit string entered by the caller as its arguments. Alternatively, this information may be transmitted to the host 418 by node 410*b* through other call processing events. The host 418, in turn, examines the digit string, determines the corresponding conference identifier and transmits a Connect to Conference message 438 to node 410*b*. The Connect to Conference message 438 includes the unique conference identifier as its arguments. As discussed above, node 410*b* transmits a Book Conference message 425*e* to and receives a Book Conference Acknowledgment 428*e* from node 410*d*. Node 410*b* then responds to the host 418 with a Connect to Conference Acknowledgment 439. Circuit switched data from the new participant is then provided to the conferencing node 410d and conferenced data returned as described above, thereby permitting the new participant to join in the conference.

It should be understood that in addition to providing conferencing services, a node having an MFDSP card may similarly broadcast the conferenced voice information to multiple users for listen-only purposes. More specifically, circuit switched PCM data associated with each speaker may be added together by the DSP resource performing the conferencing function. The sum may then be broadcast to any number of listeners utilizing a single time slot from the conferencing node.

It should be further understood that conferenced voice information may be switched onto either Ring 1 or Ring 2 of network 112 by the nodes 110a–d. That is, voice information may be received at the conferencing node 110d on Ring 1 and conferenced voice information switched out of conferencing node onto Ring 2.

As set forth above, to provide the requested conferencing services, the conferencing node 110d must allocate sufficient bandwidth on its internal switching bus to handle the traffic associated with the conferencing function. In the example described above, where the conferencing node is not connected to the PSTN or a private network, this is not likely to be a problem. If, however, the conferencing node 110d is also connected to the PSTN and/or a private network and is nearing its maximum switching capacity, there may be insufficient bandwidth to support conferencing. For example, assume a conferencing node has 2048 total time slots and the node is interfaced with the PSTN such that 2040 time slots are needed to support full non-blocking functionality of the conferencing node. In this situation, only 8 time slots would available to support conferencing.

Figure 5:
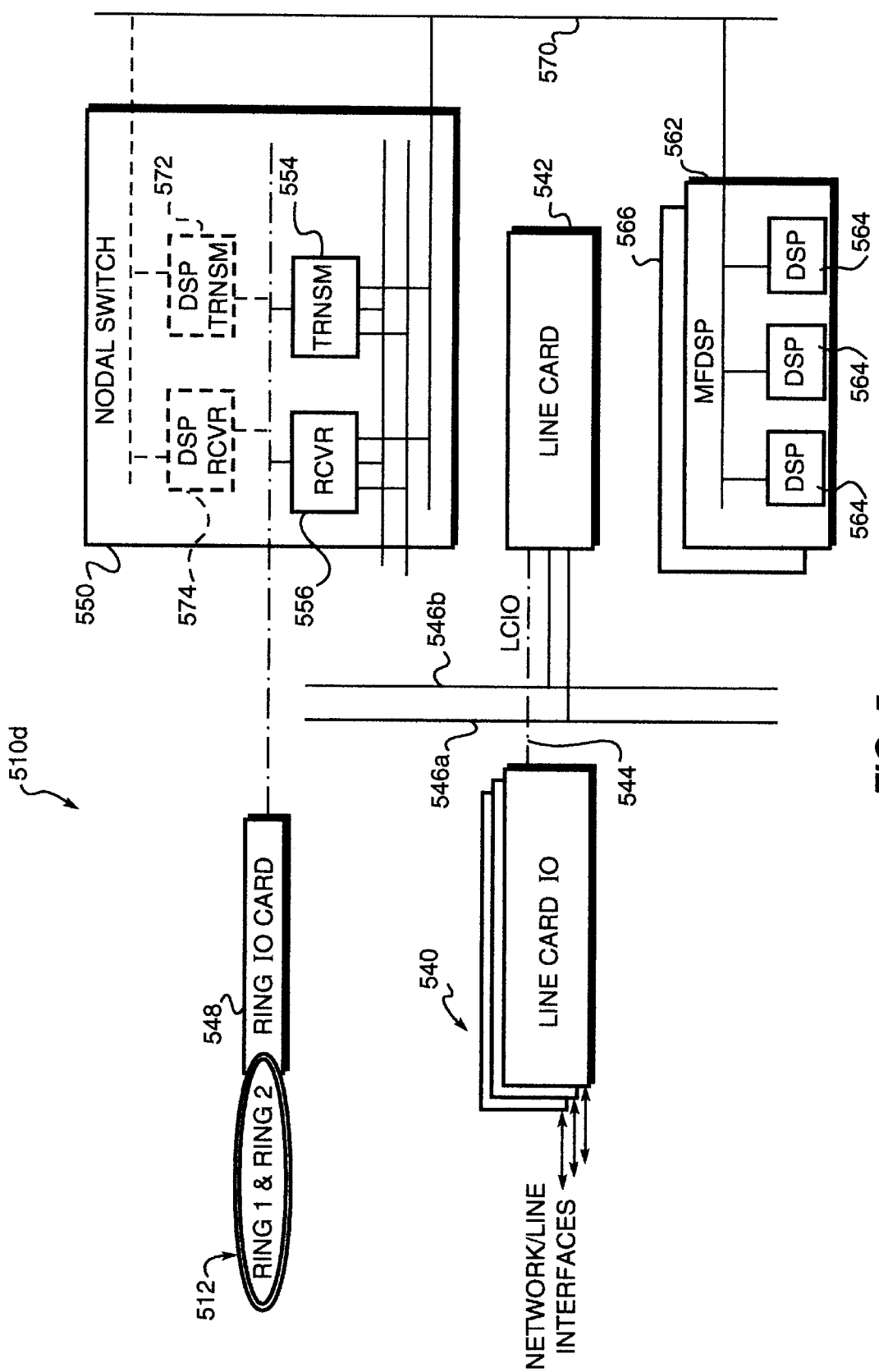
FIG. 5 is a highly schematic block diagram of another embodiment of a conferencing node that may be used in the system of FIG. 1.

FIG. 5 illustrates an alternative embodiment of a conferencing node 510d, similar to node 110d (FIG. 1). The conferencing node 510d preferably includes a separate, dedicated DSP bus 570 that interfaces between a nodal switch 550 and an MFDSP card 562. The DSP bus 570 preferably supports the transmission of TDM data at 32 Mhz and includes 4096 available time slots. The DSP bus 570 may be implemented as an eight bit parallel bus.

The nodal switch 550 preferably includes a primary data transmitter 554 and a primary data receiver 556 for communicating with an inter-nodal network 512 through a ring IO card 548. The node 510d may also include line cards 542 and line card IO cards 540 that, in turn, are connected to a plurality of network/line interfaces. Redundant main switching buses 546a, 546b provide a communications link between the line cards 542 and the nodal switch 550. As previously discussed with regard to the nodal switch 210c (FIG. 2), conferencing node 510d preferably interfaces with the PSTN 114 (FIG. 1) or a private network (not shown) via line card IO cards 540. Accordingly, information, such as voice information, may be circuit switched to a line card IO card 540 and transmitted to a line card 542 via a line card IO link 544. The circuit switched voice information may be placed on the main switching buses 546a, 546b by the line card 542 and thus transmitted to the nodal switch 550.

The primary transmitter 554 of the nodal switch 550, which is in communicating relationship with the main switching buses 546a, 546b, receives the voice information, which may then be transmitted across the inter-nodal network 512. More specifically, the transmitter 554 may store the voice information in a transmitter memory (not shown) and switch that information out of the memory into a variable length packet. The variable length packet may then be placed on the inter-nodal network 512 via the ring 10 card 548. Similarly, the primary receiver 556 may capture information from the inter-nodal network 512 addressed to the node 510d, store that information in a receiver memory (not shown) and switch it out of the receiver memory and onto the main switching buses 546a, 546b. The information may then be received by a line card 542 and provided to the appropriate port to the PSTN or private network via a line card IO card 540.

To support conferencing or any other service provided by the MFDSP card 562, the DSP bus 570 is preferably utilized. More specifically, assume a DSP chip 564 on the MFDSP card 562 has been configured and allocated, as previously described, to provide conferencing services to callers interfaced with various nodes of the system 100 (FIG. 1). First, voice information is placed on the inter-nodal network 512 by the nodes interfaced with the conference participants as previously discussed. The voice information is then captured by the receiver 556 of the conferencing node 510d. Rather than switching that information onto the main switching buses 546a, 546b, as previously described, the receiver 556 instead switches that information onto the DSP bus 570.

The information is received by the MFDSP card 562 via the DSP bus 570 and stored in a plurality of PCM banks (not shown) that are associated with the DSP chips 564. The DSP chip 564 allocated to provide the conferencing services accesses that information and executes a conferencing function thereon. The output of the DSP chip 564 is similarly placed on the DSP bus 570 via the PCM banks, rather than the main switching buses 546a, 546b. The output is then received by the transmitter 554 of the nodal switch 550 and switched into the transmitter memory. Finally, the output may be packetized by the transmitter 554 and placed on the inter-nodal network 512 for capture by the nodes interfaced with the conferees.

In this manner, the conferencing node 510d may provide conferencing services to a plurality of callers interfaced with various nodes on the system 100 (FIG. 1) without requiring the conferencing node 510d to allocate any portion of the bandwidth of the main switching buses 546a, 546b. As a result, all of the bandwidth of the main buses 546a, 546b remains available to support communications between the conferencing node 510d and users interfaced thereto through the network/line interfaces.

As shown in phantom in FIG. 5, the nodal switch 550 may also include a DSP data transmitter 572 and a DSP data receiver 574, in addition to the primary transmitter 554 and primary receiver 556. As is the case with the primary transmitter 554 and receiver 556, the DSP transmitter 572 and DSP receiver 556 communicate with the inter-nodal network 512 via the ring 10 card 548. Accordingly, the DSP transmitter is able to transmit information across the network 512 and the DSP receiver 574 is able to capture information traversing the network 512. Furthermore, the DSP transmitter 572 and the DSP receiver 574 are preferably in communicating relationship with the MFDSP card 562 via the DSP bus 570.

With this arrangement, information traversing the inter-nodal network 512 that is intended for the MFDSP card 562 of node 510d may be captured by the DSP receiver 574. The captured information, which is preferably stored in a DSP receiver memory (not shown), may be switched out of the memory and onto the DSP bus 570. From the DSP bus 570, the information is then available to the MFDSP card 562 for processing.

For example, voice information from a plurality of conferees may be placed on the network 512 and addressed to the MFDSP card 562 on node 510d. The DSP receiver 574, preferably under the control of a CPU (not shown) on the nodal switch 550, recognizes that this information is intended for the MFDSP card 562, pursuant to previously received instructions from the host 118 (FIG. 1) and captures the information. The information is then provided to the MFDSP card 562 by the DSP receiver 574 via the DSP bus 570. A DSP chip 564 located on the MFDSP card 562 may then access that information and execute a conferencing function thereon.

The output of the DSP chip 564 is similarly placed on the DSP bus 570 by the MFDSP card 562. The DSP transmitter 572, also under the control of the CPU in the nodal switch 550, retrieves this information from the DSP bus 570 and switches the information into a DSP transmitter memory (not shown). The DSP transmitter 572 formulates a packet or packets for transmitting the information received from the MFDSP card 562 onto the inter-nodal network 512. Utilizing the ring IO card 548, the information may be transmitted onto the network 512 by the DSP transmitter 572. Thus, not only does the conferencing function not consume any bandwidth of the main switching buses 546a, 546b, it also does not impact the primary transmitter 554 or receiver 556 of the conferencing node 410d. The performance of the conferencing node 510d is thus further enhanced.

Figure 6:
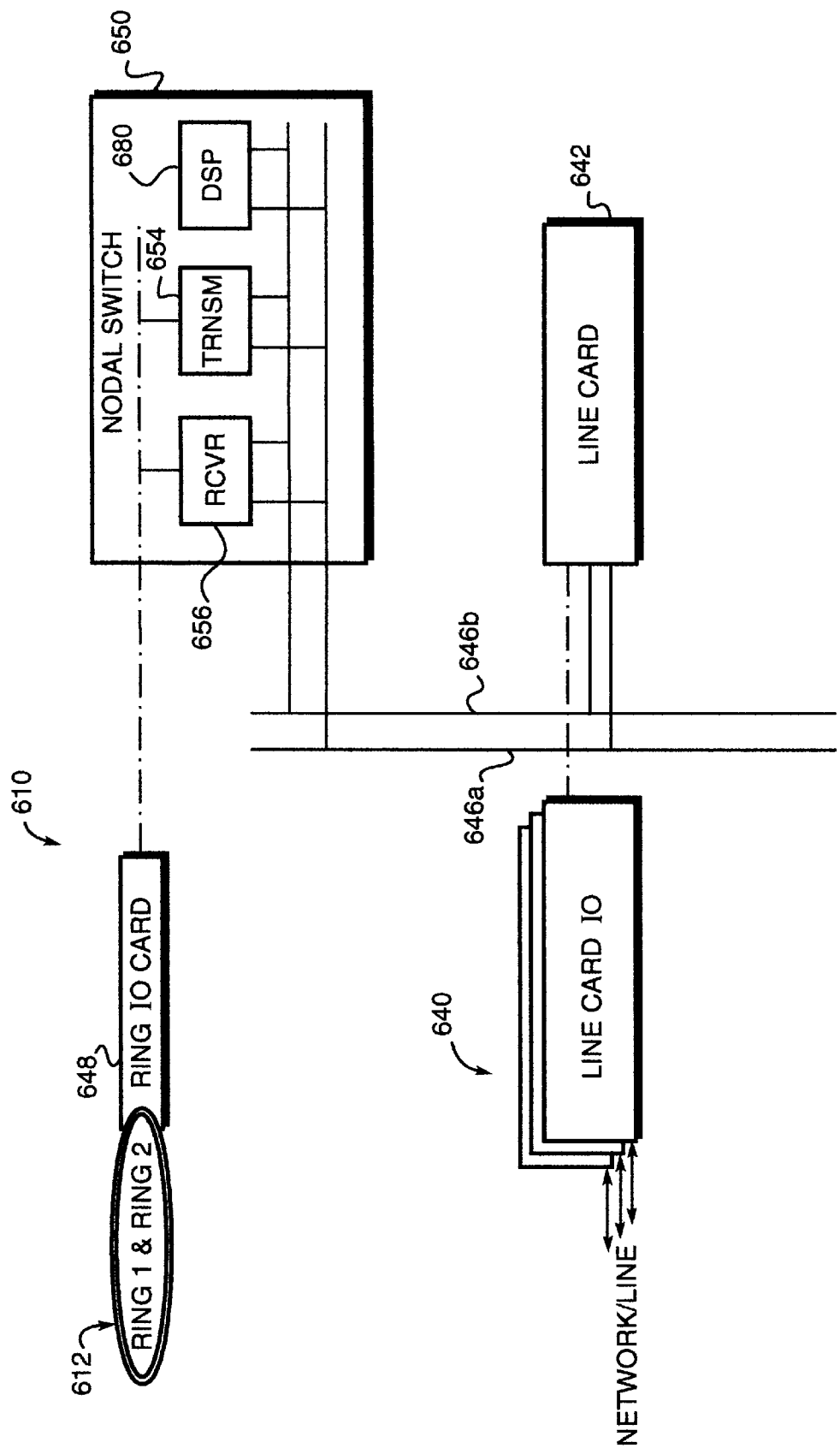
FIG. 6 is a highly schematic block diagram of another embodiment of a conferencing node that may be used in the system of FIG. 1.

Turning to FIG. 6, in another embodiment of the present invention, a DSP chip 680 configured to provide conferencing services is preferably provided on a nodal switch 650 of each node 610. The DSP chip 680 is preferably in communicating relationship with a transmitter 654 and a receiver 656 also disposed on the nodal switch 650. The DSP chip 680 also may communicate via two redundant buses 646a, 646b with a plurality of line cards 642 located on the node 610. The line cards 642, in turn, are linked to a plurality of line card IO cards 640 that provide network/line interfaces. The node 610 is thus able to provide conferencing services without the need of a separate MFDSP card 362 (FIG. 3).

More specifically, assume that a caller interfaced with node 610 requests conferencing services from the system 100 (FIG. 1). The host 118 (FIG. 1) preferably designates the DSP chip 680 on the node 610 that is interfaced with the caller to provide the requested conferencing services. Voice information from the caller is received over a line card IO card 640 and provided to a line card 642. The line card 642, under the direction of the nodal switch 650, places that information on the switching buses 646a, 646b. The information is then received by the nodal switch 650 and placed in a PCM bank (not shown) associated with the DSP chip 680.

Voice information from the other conference participants is captured from the inter-nodal network 612 by the data receiver 656 on the nodal switch 650. Rather than switching this information onto the switching buses 646a, 646b, the data receiver 656 places the information directly in the PCM bank. Accordingly, all of the voice information corresponding to the conference participants is placed in the PCM bank associated with the DSP chip 680. The DSP chip 680 then accesses this information and performs a conferencing algorithm on that information. The output of the DSP chip 680, which represents instances of conferenced voice information, is moved to the PCM bank.

Now, the data transmitter 654 on the nodal switch 650 retrieves the conferenced voice information from the PCM bank directly and packetizes that information for transmission across the inter-nodal network 612. Again, the nodal switch 650 may implement either the Full Send/Empty Return or Empty Send/Full Return method. The packet(s) are then provided to the ring IO card 648 for transmission on the inter-nodal network 612. Thus, node 610 is able to provide conferencing services without a separate MFDSP card 362 (FIG. 3).

Figure 7:
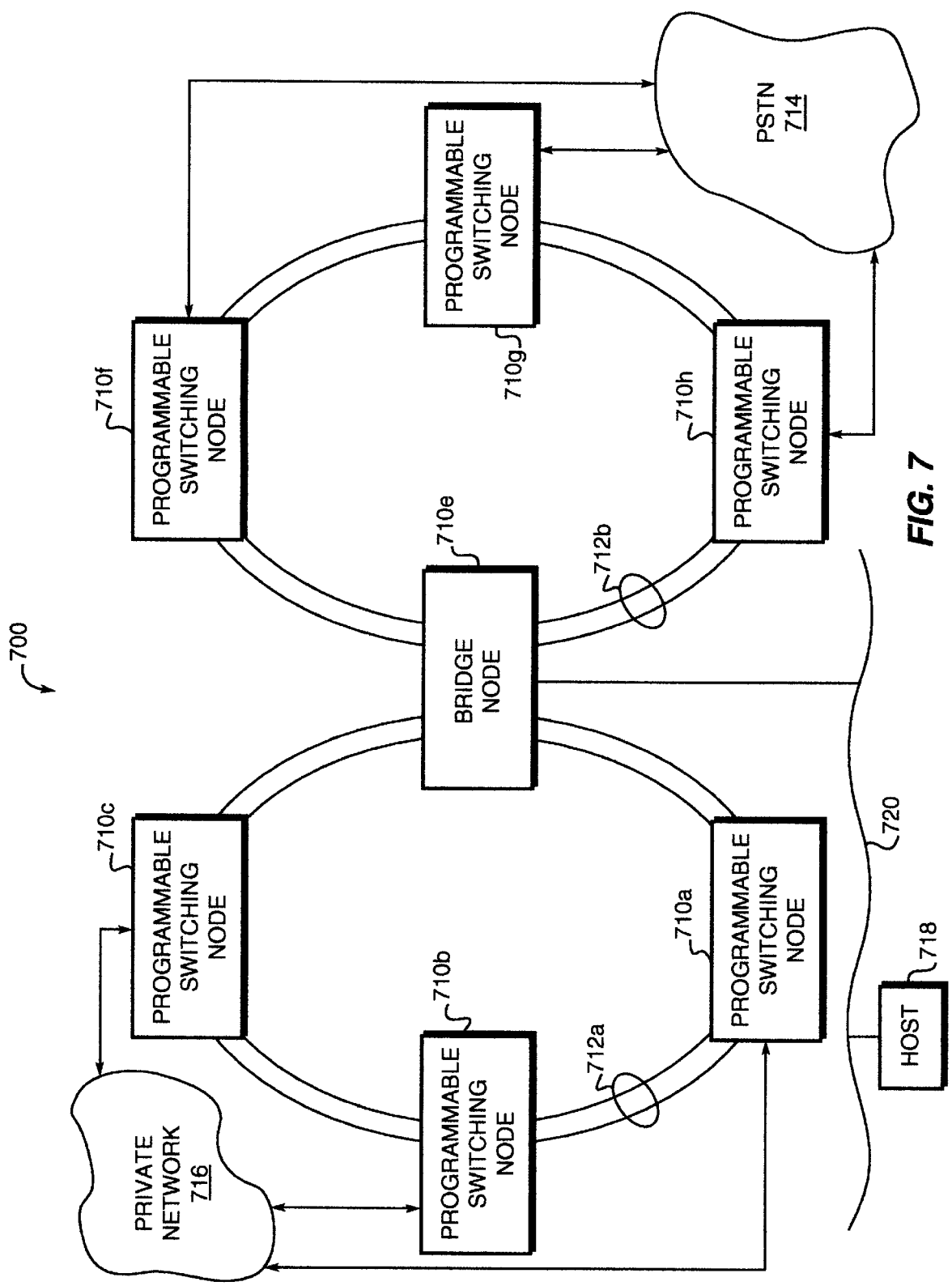
FIG. 7 is a block diagram of an expandable telecommunications system which employs a programmable switching node as a bridge between two inter-nodal networks.

As shown in FIG. 7, an expandable telecommunications system 700 may include two inter-nodal ring-type networks 712a, 712b connected by a "bridge" node 710e. Bridge 710e appears as a node on both inter-nodal networks 712a, 712b and is thus interfaced with both networks. Each network 712a, 712b, moreover, includes a plurality of programmable switching nodes 710a–710c and 710f–710h, respectfully, at least one of which includes an MFDSP card 362 (FIG. 3). The nodes 710a–710c may interface with a private network 716 whereas nodes 710f–710h may interface with the PSTN 714. By virtue of its access to both inter-nodal networks 712a, 712b, bridge 710e is capable of exchanging information bi-directionally between the two networks 712a, 712b. The bridge 710e is preferably controlled by a host 718 and includes the same components as a programmable switching node. The host 718 may communicate with the bridge 710e and, hence all the other nodes 710a–710c and 710f–710h, via a LAN 720. To permit the bridge 710e to have access to all of the information in both networks 712a, 712b, it further includes two additional ring IO cards (not shown) and two additional (or a total of four) nodal switches (not shown).

In this embodiment, if all conferencing resources available on one inter-nodal network (e.g., 712a) are already allocated, the host 718 may locate and designate available conferencing resources that are located on the second inter-nodal network (e.g., 712b). Thus, by virtue of the bridge's ability to exchange information bi-directionally between the two networks 712a, 712b, conferencing services may be provided to callers interfaced with the system 700 even though all of the callers may be physically interfaced to a different network than the allocated conferencing resources.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. An expandable telecommunications system capable of conferencing three or more conferees interfaced with the system, the system comprising:

A. a plurality of nodes for performing telecommunications switching, each of said switching nodes including means for dynamically connecting or disconnecting communication paths with respect to various ones of a plurality of ports, means for time switching information to or from said ports, means for transmitting and receiving information in packetized form, and means connected in communicating relationship with said time switching means for interfacing with one or more public or private networks which represent said ports, said communicating relationship including a bus for carrying data to and from said ports, and also having means for generating and sending a message requesting establishment of a conference call for at least three conferees connected to one or more of said nodes;

B. a host connected in communicating relationship with at least one of said switching nodes said host controlling predetermined operations of the system;

C. means for interconnecting said switching nodes in communicating relationship and operable in conjunction with said transmitting and receiving means to transfer said packetized information such that information, including circuit switched data, which originates from any port of any of said switching nodes is substantially continuously communicable to any node interfaced with said interconnecting means; and D. at least one conferencing node for providing conferencing services, said at least one conferencing node interfaced with said interconnecting means and including:

means for transmitting and receiving information in packetized form, and for receiving a request to establish a conference, determining whether said conferencing node has available conferencing resources to perform a requested conference, and if so, for responsively sending a message indicating such availability subsequently reserving sufficient conferencing resources in response to receipt of a book conference message, receiving information to be conferenced, and executing a conferencing function on said received information so as to generate conferenced information, and for transmitting said conferenced information over said interconnecting means to the conferees.

2. The expandable telecommunications system of claim 1 including a plurality of conferencing nodes, said system further comprises means for identifying a first conferencing node having sufficient available conferencing resources to perform the conferencing services requested by the three or more conferees.

3. The expandable telecommunications system of claim 2 further comprising means for instructing the first conferencing node to reserve the available conferencing resources.

4. The expandable telecommunications system of claim 3 further comprising means for informing respective ones of the switching nodes interfaced with the three or more callers of the identity of the first conferencing node.

5. The expandable telecommunications system of claim 4 whereby voice information generated by the three or more callers is communicated over the interconnecting means by the respective ones of the switching nodes interfaced with the three or more callers and directed to the first conferencing node.

6. The expandable telecommunications system of claim 5 whereby the transmitting and receiving means of the first conferencing node captures the voice information and provides it to the reserved conferencing resources.

7. The expandable telecommunications system of claim 6 whereby the reserved conferencing resources generate an instance of conferenced voice information for each of the three or more callers in response to the received voice information and communicate each instance of conferenced voice information to the transmitting and receiving means of the first conferencing node.

8. The expandable telecommunications system of claim 7 whereby the first conferencing node communicates each instance of conferenced voice information over the interconnecting means for transmission to the respective ones of the switching nodes interfaced with the three or more callers.

9. The expandable telecommunications system of claim 8 whereby each instance of conferenced voice information is captured by the appropriate one of the respective switching nodes and time switched to the appropriate one of the ports associated with the corresponding caller.

10. The expandable telecommunications system of claim 9 wherein the first conferencing node further comprises a nodal switch and the transmitting and receiving means is located at the nodal switch.

11. The expandable telecommunications system of claim 10 wherein the first conferencing node further comprises a multifunction digital signal processing (MFDSP) card representing some of the conferencing resources and further wherein said communicating relationship between the conferencing resources and the transmitting and receiving means includes a bus structure.

12. The expandable telecommunications system of claim 11 wherein the first conferencing node further comprises a plurality of ports interfaced with one or more public and/or private networks, means for dynamically connecting or disconnecting communication paths with respect to various ones of said ports and means for time switching information to or from said ports, wherein said ports and time switching means are connected to said bus structure.

13. The expandable telecommunications system of claim 10 wherein the first conferencing node further comprises a multifunction digital signal processing (MFDSP) card containing the conferencing resources and further wherein said communicating relationship between the conferencing resources and the transmitting and receiving means includes a dedicated digital signal processing (DSP) bus structure coupling the MFDSP card with the transmitting and receiving means.

14. The expandable telecommunications system of claim 13 wherein the first conferencing node further comprises a plurality of ports interfaced with one or more public and/or private networks, means for dynamically connecting or disconnecting communication paths with respect to various ones of said ports and means for time switching information to or from said ports, wherein said ports and time switching means are connected to a pulse code modulation (PCM) bus.

15. The expandable telecommunications system of claim 10 further comprising means for transmitting and receiving digital signal processing (DSP) information in packetized form operable in conjunction with said interconnecting means to transfer packetized DSP information over said interconnecting means.

16. The expandable telecommunications system of claim 15 wherein the first conferencing node further comprises a multifunction digital signal processing (MFDSP) card containing the conferencing resources and further wherein said MFDSP card is in communicating relationship with the DSP transmitting and receiving means.

17. The expandable telecommunications system of claim 16 wherein the communicating relationship between the MFDSP card and DSP transmitting and receiving means includes a dedicated digital signal processing (DSP) bus structure coupling the MFDSP card with the DSP transmitting and receiving means.

18. The expandable telecommunications system of claim 10 further wherein the conferencing resources are located on the nodal switch and are in communicating relationship with the transmitting and receiving means by an internal nodal bus structure.

19. A method of providing conferencing services in an expandable telecommunications system having a plurality of nodes including switching nodes and conferencing nodes in communicating relationship by an inter-nodal network and a host coupled to at least one node for controlling the system in which the conferencing resources are utilized by one or more nodes participating in a conference, said method comprising the steps of:

(a) in response to a request to perform conferencing services at a first node, transmitting a resource locate message over said network for locating a second node having available conferencing resources to perform the conference;

(b) receiving the resource locate message at a conferencing node and responding to said first node with an acknowledgment indicating that the conferencing node has available conferencing resources capable of performing the conference;

(c) transmitting a conference acknowledgment over said network from the first node to the host informing the host of the identity of the conferencing node;

(d) receiving the conference acknowledgment at the host and commanding the first node and any other nodes participating in the conference to connect to the conferencing node over the inter-nodal network;

(e) in response to step (d), transmitting a book conference message over said network from the first node and any other participating nodes to the conferencing node requesting access to the corresponding conferencing resources;

(f) transmitting information to be conferenced over said network from the first node and any other participating nodes to the conferencing node;

(g) receiving the information to be conferenced at the conferencing node, executing a conferencing function on the information so as to generate conferenced information and transmitting the conferenced information over said network to the first node and any other participating nodes; and (h) receiving the conferenced information at the first node and any other participating nodes.

20. The method of claim 19 wherein each conferencing node includes at least one digital signal processor (DSP) configured to perform a conferencing algorithm on received information so as to generate corresponding conferenced information and transmitting and receiving means connected to the at least one DSP by a bus structure and to the inter-nodal network for receiving information to be conferenced and transmitting corresponding conferenced information.

21. The method of claim 20 further comprising the step of directing each conferencing node to allocate the at least one DSP and resources of the bus structure for purposes of performing conferencing services.

22. The method of claim 21 further comprising the steps of:

(i) in response to a request to join the conference at a given node, transmitting a message to the host requesting to join in the conference established by the conferencing node;

(j) receiving the message at the host and commanding the given node to connect to the conferencing node;

(k) in response to step (j), transmitting a book conference message over said network from the given node to the conferencing node requesting access to the corresponding conferencing resources;

(f) transmitting information to be conferenced over said network from the given node to the conferencing node;

(g) receiving the information to be conferenced transmitted by the given node at the conferencing node, executing a conferencing function on the information so as to generate conferenced information intended for the given node and transmitting the corresponding conferenced information over said network to the given participating node; and (h) receiving the conferenced information at the given node.

23. A method of providing conferencing services in an expandable telecommunications system having a plurality of nodes in communicating relationship by an inter-nodal network and a host coupled to at least one node for controlling the system in which the conferencing resources are utilized by one or more nodes participating in a conference, said method comprising the steps of:

(a) in response to a request to perform conferencing services from a first node, determining that the first node has available conferencing resources capable of performing the conference;

(b) transmitting a conference acknowledgment over said network from the first node to the host informing the host that the first node has available conferencing resources and including the identity of the first node;

(c) receiving the conference acknowledgment at the host and commanding any other participating nodes to connect to the first node over the inter-nodal network;

(d) in response to step (c), transmitting a book conference message over said network from any other participating nodes to the first node requesting access to the corresponding conferencing resources;

(e) transmitting information to be conferenced from one or more conferees coupled to the first node to the conferencing resources;

(f) transmitting information to be conferenced over said network from any other participating nodes to the first node;

(g) receiving the information to be conferenced at the conferencing resources of the first node and executing a conferencing function on the information so as to generate conferenced information;

(h) transmitting the appropriate conferenced information to the one or more conferees coupled to the first node;

(i) transmitting the appropriate conferenced information over said network to any other participating nodes; and (j) receiving the conferenced information at any other participating nodes.

24. The method of claim 23 wherein the first node includes at least one digital signal processor (DSP) configured to perform a conferencing algorithm on received information so as to generate corresponding conferenced information and transmitting and receiving means connected to the at least one DSP by a bus structure and to the inter-nodal network for receiving information to be conferenced and transmitting corresponding conferenced information.

25. The method of claim 24 further comprising the steps of:

(i) in response to a request to join the conference received at a given node, transmitting a message the host requesting to join in the conference established by the first node;

(j) receiving the message at the host and commanding the given node to connect to the first node;

(k) in response to step (j), transmitting a book conference message over said network from the given node to the first node requesting access to the corresponding conferencing resources;

(f) transmitting information to be conferenced over said network from the given node to the first node;

(g) receiving the information to be conferenced transmitted by the given node at the first node, executing a conferencing function on the information so as to generate conferenced information intended for the given node and transmitting the corresponding conferenced information over said network to the given node; and (h) receiving the conferenced information at the given node.

26. A telecommunications switch which is operable as a node in an expandable telecommunications system, said switch comprising:

means for dynamically connecting or disconnecting communication paths with respect to various ones of a plurality of ports;

means for time switching information to or from said ports, said time switching means having a capacity which corresponds with a maximum number of ports which may be physically associated with said telecommunications switch;

means connected in communicating relationship with said time switching means for interfacing with one or more public or private networks which represent said ports, said communicating relationship including a bus for carrying data to and from said ports;

means for transmitting and receiving packetized information over an inter-nodal network, said inter-nodal network for providing communications between said telecommunications switch and other nodes associated with said system, whereby information, including circuit switched data, which originates from any port of said telecommunications switch is substantially continuously communicable to any other port of said switch or any other node of said system; and means, responsive to a request for performing conferencing services involving at least one conferee connected to a port on said switch, for transmitting a resource locate message for identifying and for locating sufficient conferencing resources within said system to perform the requested conferencing services, and for transmitting a book conference message upon identification of such resources such that resources sufficient for that particular conference are reserved, and for transmitting said node's own information to be conferenced to said reserved resources which perform a conferencing function on said information and upon information received from other nodes participating in the conference to generate conferenced information, and for receiving the conferenced information from the reserved resources for that particular conference.

27. The telecommunications switch of claim 26 wherein the switch provides packetized information from at least one port coupled to a conferee to the conferencing resources, receives corresponding packetized conferenced information from the conferencing resources and time switches said conferenced information to the at least one port coupled to the conferee.

28. The telecommunications switch of claim 27 wherein the locating means is capable of locating conferencing resources either within the telecommunications switch or at a second node within the inter-nodal network.

* * * * *